(12) United States Patent
Bacon et al.

(10) Patent No.: US 8,635,825 B2
(45) Date of Patent: Jan. 28, 2014

(54) MODULAR ROOF PANELS (75) Inventors: John C. Bacon, Rowlett, TX (US); John D. Bacon, Rockwall, TX (US)

(73) Assignee: Green Tech Products, LLC, Rockwall, TX (US)

( * ) Notice: Subject to any disclaimer, the term of this patent is extended or adjusted under 35 U.S.C. 154(b) by 0 days.

(21) Appl. No.: 13/603,488

(22) Filed: Sep. 5, 2012

(65) Prior Publication Data

US 2013/0232899 A1 Sep. 12, 2013

Related U.S. Application Data (60) Provisional application No. 61/531,672, filed on Sep. 7, 2011.

(51) Int. Cl.
*E04D 1/28* (2006.01)
*E04D 3/32* (2006.01)
*E04D 3/35* (2006.01)

(52) U.S. Cl.
USPC ...... 52/309.9; 52/417; 52/506.01; 52/746.11; 156/71; 156/304.3; 428/71; 428/157

(58) Field of Classification Search
USPC ........ 52/408, 411, 412, 417, 459, 471, 309.9, 52/506.01, 746.1, 746.11, 747.11; 156/71, 156/157–160, 304.1, 304.3, 304.5
See application file for complete search history.

(56) References Cited

U.S. PATENT DOCUMENTS

| 2,196,807 | A | * | 4/1940 | Eckert | 52/464 |
|---|---|---|---|---|---|
| 3,093,935 | A | * | 6/1963 | Dunn | 52/309.8 |
| 3,109,206 | A | * | 11/1963 | Beam | 52/417 |
| 3,468,086 | A | * | 9/1969 | Warner | 52/173.1 |
| 3,546,843 | A | | 12/1970 | Luebs et al. | |
| 3,574,985 | A | | 4/1971 | Pierce | |
| 3,643,388 | A | | 2/1972 | Parr et al. | |
| 3,650,872 | A | * | 3/1972 | McKiernan | 156/304.3 |
| 3,795,722 | A | * | 3/1974 | Sassaman | 264/46.4 |
| 3,875,715 | A | | 4/1975 | Martin et al. | |
| 3,919,822 | A | | 11/1975 | Martin et al. | |
| 3,962,016 | A | * | 6/1976 | Alfter et al. | 156/304.3 |
| 3,984,269 | A | * | 10/1976 | Schneller et al. | 156/71 |
| 4,044,520 | A | * | 8/1977 | Barrows | 52/309.12 |
| 4,063,395 | A | * | 12/1977 | Stewart et al. | 52/309.5 |
| 4,104,840 | A | * | 8/1978 | Heintz et al. | 52/309.9 |
| 4,194,335 | A | | 3/1980 | Diamond | |
| 4,282,697 | A | * | 8/1981 | Spielau et al. | 52/746.11 |
| 4,366,656 | A | | 1/1983 | Simpson | |
| 4,423,572 | A | | 1/1984 | Tor | |
| 4,432,183 | A | | 2/1984 | Pike et al. | |
| 4,441,295 | A | | 4/1984 | Kelly | |
| 4,519,172 | A | | 5/1985 | Ristow | |
| 4,544,595 | A | | 10/1985 | Tomason | |
| 4,651,494 | A | * | 3/1987 | Van Wagoner | 52/592.1 |
| 4,706,435 | A | | 11/1987 | Stewart | |

(Continued)

*Primary Examiner* — Robert Canfield
(74) *Attorney, Agent, or Firm* — Winstead PC (57) ABSTRACT A roofing panel includes a front surface, a top surface, a bottom surface, a right-side surface, a left-side surface and a rear surface, the front surface, the top surface, the bottom surface, the right-side surface, the left-side surface and the rear surface include a waterproofing membrane. A plurality of top perimeter edges, the plurality of top perimeter edges include substantially concave bevels. A plurality of bottom perimeter edges, the plurality of bottom perimeter edges include substantially convex bevels. The bottom surface of the roofing panel includes an adhesive for adhering the roofing panel to a roof deck.

19 Claims, 5 Drawing Sheets

SIDE VIEW OF TWO PANELS

(56) References Cited

U.S. PATENT DOCUMENTS

| | | | |
|---|---|---|---|
| 4,760,679 A | 8/1988 | Thompson | |
| 4,856,236 A | 8/1989 | Parker | |
| 4,932,184 A | 6/1990 | Waller | |
| 4,948,655 A | 8/1990 | Danese | |
| 4,949,522 A | 8/1990 | Harada | |
| 4,965,977 A * | 10/1990 | White | 52/410 |
| 4,981,762 A * | 1/1991 | Athey, Jr. | 428/594 |
| 5,088,260 A * | 2/1992 | Barton et al. | 52/416 |
| 5,215,805 A | 6/1993 | Pavia, Jr. | |
| 5,251,415 A | 10/1993 | Van Auken et al. | |
| 5,251,416 A * | 10/1993 | White | 52/410 |
| 5,363,621 A * | 11/1994 | Kroll et al. | 52/506.01 |
| 5,381,638 A * | 1/1995 | Andersson | 52/592.1 |
| 5,394,672 A * | 3/1995 | Seem | 52/794.1 |
| 5,419,666 A | 5/1995 | Best | |
| 5,452,553 A | 9/1995 | Clapp et al. | |
| 5,635,125 A | 6/1997 | Ternes et al. | |
| 5,644,880 A | 7/1997 | Lehnert et al. | |
| 5,853,511 A * | 12/1998 | Fairbanks | 156/71 |
| 5,983,592 A | 11/1999 | Mayle | |
| 6,021,616 A | 2/2000 | Mayle | |
| 6,110,311 A | 8/2000 | Mayle et al. | |
| 6,151,855 A | 11/2000 | Campbell | |
| 6,158,191 A * | 12/2000 | Seem | 52/746.11 |
| 6,282,858 B1 | 9/2001 | Swick | |
| 6,546,687 B2 | 4/2003 | Oh et al. | |
| 6,581,348 B2 * | 6/2003 | Hunter, Jr. | 52/408 |
| 6,952,901 B2 | 10/2005 | Jacques et al. | |
| 7,204,062 B2 | 4/2007 | Fairbanks et al. | |
| 7,331,150 B2 | 2/2008 | Martinique | |
| 7,520,098 B1 | 4/2009 | Martinique et al. | |
| 7,563,478 B1 | 7/2009 | Humphreys et al. | |
| 7,600,356 B2 | 10/2009 | Benjamin et al. | |
| 2006/0096213 A1 | 5/2006 | Griffin et al. | |
| 2007/0022711 A1 | 2/2007 | Paradis et al. | |

\* cited by examiner

MODULAR ROOF PANELS

CROSS-REFERENCE TO RELATED APPLICATIONS

This patent application claims priority from, and incorporates by reference the entire disclosure of, U.S. Provisional Patent Application No. 61/531,672, filed on Sep. 7, 2011.

BACKGROUND OF THE INVENTION

1. Technical Field

The present invention relates generally to sustainable roofing systems, and more particularly, but not by way of limitation, to a sustainable roofing system comprising, for example, modular, insulated, generally flat roofing panels that provide superior outer containment of water for drainage purposes, long life, and fast, reliable installation.

2. History of Related Art

Commercial and industrial buildings typically have roofs with low-slope roof decks. The roofing systems for these roofs with low-slope roof decks typically include one or more layers of a low-density roofing insulation, a layer of roofing cover boards that overlie the low-density roofing insulation layer(s), and a waterproofing membrane that overlies the layer of cover boards. The layer(s) of low-density insulation such as, for example, a low-density polymer-based foam insulation, if not protected, can be partially crushed or otherwise damaged from worker traffic over the insulation, the placement of heavy objects on the insulation, weather, and other causes commonly encountered in roofing construction. The layer of roofing cover boards that overlies the one or more layers of low-density insulation, protects the more fragile low density insulation from damage, acts as a fire barrier, provides a suitable substrate for the attachment of the overlying waterproofing membrane, and augments the insulating function of the low-density insulation. The uppermost waterproofing membrane layer overlying the cover board layer protects the underlying cover board and insulation layers from moisture and other adverse climatic conditions. Normally, these three components (the low-density insulation boards, the roofing cover boards, and the waterproofing membrane) of the roofing system are separately manufactured and separately and successively applied to the low-slope roof deck.

Currently, generally flat roof systems are installed in layers. For example, a first step in the installation of a generally flat roofing system is roof insulation, which must be protected from weather hazards. This causes a logistical problem for staging material. In addition to dry conditions prior to installation, roof insulation must also be made waterproof at an end of each work day resulting in loss of valuable time at the end of each work day. For example, waterproofing the roof insulation is achieved by making an open edge waterproof and the following morning preparing/removing newly waterproofed edge to continue work. Once the insulation is installed, a variety of waterproof materials are used. All current products are affected by weather such as, for example, a threat of rain. If it happens to rain on unprotected roof insulation, the roof insulation is required to be torn out and replaced. As a result, many roofing contractors err on the side of caution and choose not to work with even a small threat of rain, resulting in many days of production being lost. This delay causes total project completion time to increase significantly. Many trades, including HVAC, electrical, sheetrock and flooring contractors cannot work until building is waterproof.

In the case of a roof already in place, a small leak or section damaged by a storm results in water to enter the roofing system. The water travels under and through other pieces of insulation to other parts of the roofing system. In many instances, the only remedy is to tear off and replace the entire roof. Multiple areas on an inside of a building sustain water damage from one leak source. The migrating nature of flat roof leaks can be extremely difficult to pinpoint, specially if the roofing system comprises a top layer of rock.

In addition, many flat roofs are replaced within 20 years. This process typically involves removing the waterproof material as well as the insulation. This process is costly and opens the building up to the risk of water damage. When roofing insulation on a flat roof becomes wet it must be removed. During installation, this condition slows the overall speed at which a traditional flat roof can be installed (due to threats of rain and the preventative measures at the end of each work day). After installation, a small leak can make it necessary to replace the entire roof.

BRIEF SUMMARY OF THE INVENTION

A roofing panel includes a front surface, a top surface, a bottom surface, a right-side surface, a left-side surface and a rear surface, the front surface, the top surface, the bottom surface, the right-side surface, the left-side surface and the rear surface include a waterproofing membrane. A plurality of top perimeter edges, the plurality of top perimeter edges include substantially concave bevels. A plurality of bottom perimeter edges, the plurality of bottom perimeter edges include substantially convex bevels. The bottom surface of the roofing panel includes an adhesive for adhering the roofing panel to a roof deck.

A roofing system for a generally flat roof. The roofing system includes a generally flat roof deck and a plurality of roofing panels, each roofing panel of the plurality of roofing panels include a front surface, a top surface, a bottom surface, a right-side surface, a left-side surface and a rear surface. The front surface, the top surface, the bottom surface, the right-side surface, the left-side surface and the rear surface include a waterproofing membrane. A plurality of top perimeter edges of the roofing panel include substantially concave bevels while a plurality of bottom perimeter edges of the roofing panels include substantially convex bevels. The bottom surface of the roofing panel includes an adhesive for adhering each roofing panel to the generally flat roof deck.

A method of installing a generally flat roof, the method includes providing a plurality of roofing panels, each roofing panel of the plurality of roofing panels includes a front surface, a top surface, a bottom surface, a right-side surface, a left-side surface and a rear surface. The method further includes applying to the bottom surface of each roofing panel of the plurality of roofing panels, an adhesive, adhering the plurality of roofing panel to the generally flat roof via the adhesive, and sealing a plurality of seams formed by adjoining the plurality of roofing panels to form an effective barrier against water infiltration.

BRIEF DESCRIPTION OF THE DRAWINGS

A more complete understanding of the method and system of the present invention may be obtained by reference to the following Detailed Description when taken in conjunction with the accompanying drawings wherein.

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Exemplary embodiments provide a waterproof sustainable roofing system comprising, for example, modular, insulated, generally flat roofing panels that greatly reduce damage from leaks and provides superior outer containment of water for drainage purposes, long life, and fast installation.

Figure 1A:
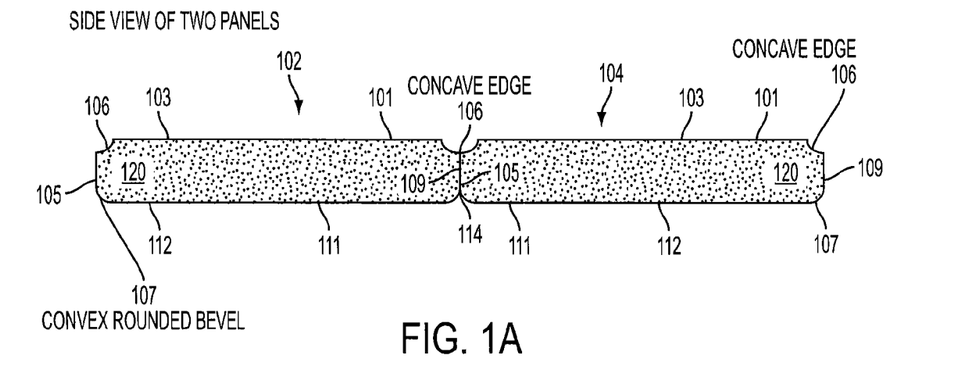
FIG. 1A is a side view of two exemplary roof panels according to an exemplary embodiment.
Figure 1B:
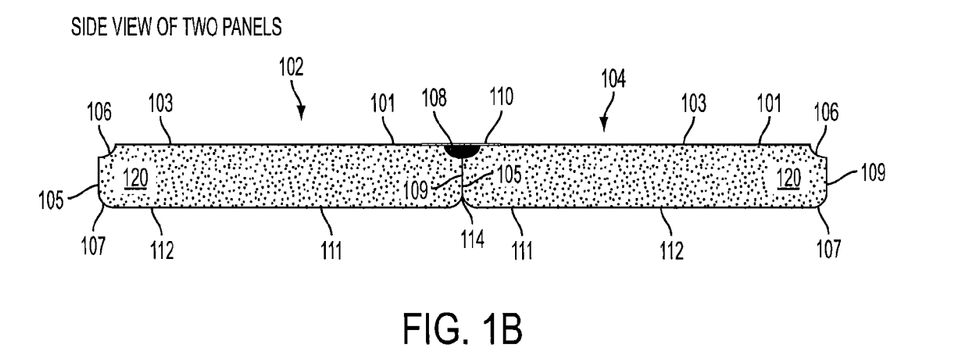
FIG. 1B is a side view of two exemplary roof panels adjoined via an adhesive according to an exemplary embodiment.
Figure 1C:
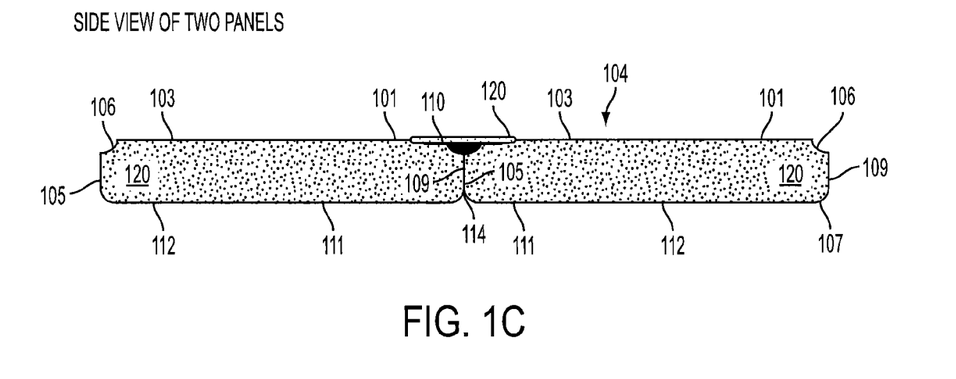
FIG. 1C is a side view of two exemplary roof panels adjoined via an adhesive and a primary seam coat according to an exemplary embodiment.

FIG. 1A is a side view of two exemplary roof panels according to an exemplary embodiment. FIG. 1B is a side view of two exemplary roof panels adjoined via an adhesive according to an exemplary embodiment. FIG. 1C is a side view of two exemplary roof panels adjoined via an adhesive and a primary seam coat according to an exemplary embodiment. Referring now to FIGS. 1A-1C, in a typical embodiment, each roof panel 102, 104 is made of, for example, insulated foam. Each roof panel 102, 104 may be, for example, waterproofed on all sides with waterproof membranes 103 such as, for example, a polyurea membrane. For exemplary purposes, a polyurea membrane is disclosed for waterproofing which is durable, chemical resistant, and is available in a variety of colors; however, in alternate embodiments, any waterproof membrane, waterproof liquid or waterproofing technique may be utilized for waterproofing the exemplary roof panels 102, 104. For example, the waterproof membrane 103 may be any waterproofing roofing membrane such as, but not limited to, silicone based waterproofing membrane, polyurethane waterproofing membrane, bituminous waterproofing membrane, modified bituminous roofing membrane, self-adhering roofing membrane, or single ply waterproofing roofing membrane (e.g. EPDM waterproofing roofing membrane, PVC waterproofing roofing membrane, TPO waterproofing roofing membrane).

In a typical embodiment, each exemplary roof panel 102, 104 is illustrated as being generally rectangular shaped; however, in alternate embodiments, the exemplary roof panels 102, 104 may be of varying shapes such as, for example, square, wedge shaped, elongated triangles, and the like. In a typical embodiment, the exemplary roof panels 102, 104 may be of varying size and thickness such as, for example, 8 ft by 4 ft, 4 ft by 4 ft, 3 ft by 3 ft and the like depending on design requirements. Each exemplary roof panel 102, 104, on top perimeter edges, comprise substantially concave bevels 106 while bottom and side perimeter edges comprise substantially convex bevels 107. The substantially concave bevels 106 prevent the formation of 90° angles at the top perimeter edges of the exemplary roof panels 102 thereby promoting optimal waterproofing. The substantially concave bevels 106 allow the top perimeter edges of the exemplary roof panels 102 to receive a more consistent waterproof coating. In addition, the substantially concave bevels 106 provide a wider joint space when the two exemplary roof panels 102, 104 are adjoined, thus forming a tighter waterproof bond. The substantially convex bevels 107 prevent the formation of 90° angles at the bottom and side perimeter edges of the exemplary roof panels 102 thereby promoting optimal waterproofing. The substantially convex bevels 107 allow the bottom and side perimeter edges of the exemplary roof panels 102 to receive a more consistent waterproof coating. In addition, the substantially convex bevels 107 allow the exemplary roof panels 102, 104 to function as a reservoir to mitigate water intrusion. In alternate embodiments, the top perimeter edges, bottom perimeter edges and side perimeter edges may be of varying shapes and sizes depending on design requirements.

Figure 2A:
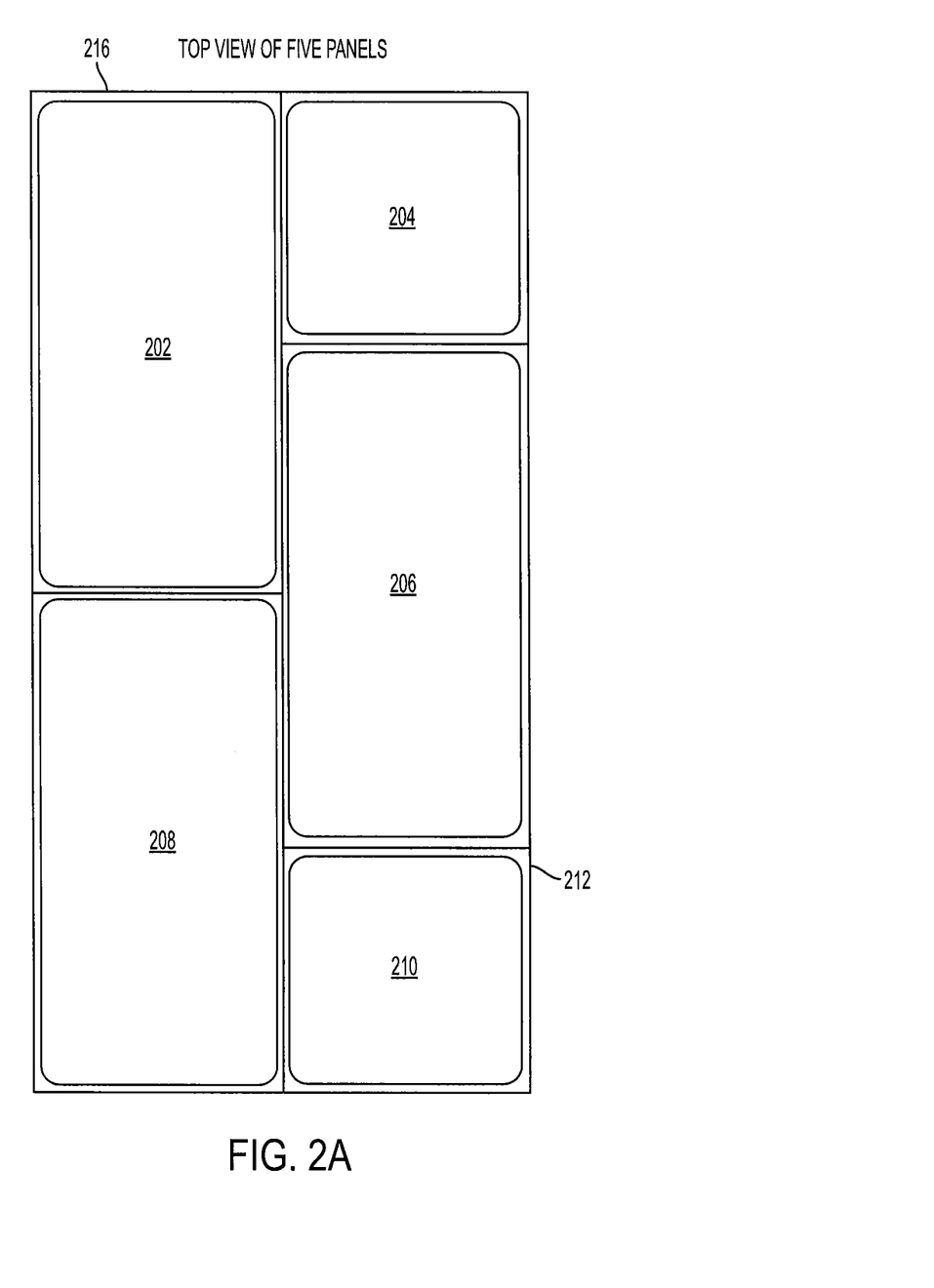
FIG. 2A is a top view illustrating five exemplary roof panels attached to a roof deck according to an exemplary embodiment.

Each roof panel 102, 104 includes a front surface 120, a top surface 101, a bottom surface 111, a left-side surface 105, a right-side surface 109, and a rear surface 216 (illustrated in FIG. 2A). In a typical embodiment, the front surface 120, the top surface 101, the bottom surface 111, the left-side surface 105, the right-side surface 109, and the rear surface 216 form each of the exemplary roof panels 102, 104. The exemplary roof panels 102, 104 are waterproofed and attached to a roof deck. In a typical embodiment, the bottom surface 111 of each of the exemplary roof panels 102, 104 has a self-adhering adhesive 112 thereon for adhering the exemplary roof panels 102, 104 to the roof deck. The self-adhering adhesives 112 may be, for example, water-based adhesives, solvent-based adhesives, or other commonly available self-adhering adhesives that stick and bond the exemplary roof panels 102, 104 to a surface of an underlying roofing layer of the roof deck. According to alternate embodiments, the self-adhering adhesive 112 may be in the form of a plurality of spaced-apart self-adhering adhesive strips for adhering the exemplary roof panels 102, 104 to the roof deck. The self-adhering adhesive 112 for adhering the exemplary roof panels 102, 104 to the roof deck has sufficient holding power to exceed current code guidelines and provide several advantages over conventional methods of adhering the exemplary roof panels 102, 104 to the roof deck. For example, the self-adhering adhesives 112 provide more points of contact with the roofing layer of the roof deck resulting in more stability and minimizes possible damage to roof deck due to conventional methodology utilizing screws for attachment.

Conventional roof systems use, for example, hot asphalt, screws or a combination. Hot asphalt is being used less often as building owners are migrating to more energy efficient roof systems. Although adhesives are available, most other systems use screws. Putting thousands of screws (and holes) into the roof deck is not the most prudent choice. Over time, screws back out and puncture the roof deck from the bottom resulting in water damage.

In a typical embodiment, the two exemplary roof panels 102, 104 may be adjoined via, for example, an adhesive 108. In a typical embodiment, the adhesive 108 may be, for example, any bonding agent for adjoining the exemplary roof panels 102, 104. In addition, the adhesive 108 is operable to waterproof a seam 114 that adjoins the exemplary roof panels 102, 104. In a typical embodiment, the adhesive 108 may be similar to the self-adhering adhesive 112 disclosed above. After applying the adhesive 108, waterproof reinforcement strips and/or mesh 110 are applied on top of the adhesive 108. Next, a primary seam coat 120 is applied. In a typical embodiment, the primary seam coat 120 comprises a petroleum-based liquid that is applied to the seams for adjoining the exemplary roof panels 102, 104 to protect them from oxidation and damage caused by winter cracking and Ultra Violet (UV) rays. According to alternate embodiments, non-petroleum-based primary seam coat 120 may be utilized. In a typical embodiment, the application of the adhesive 108 and the primary seam coat 120 is performed after the exemplary roof panels 102, 104 are attached to the roof deck.

Figure 2B:
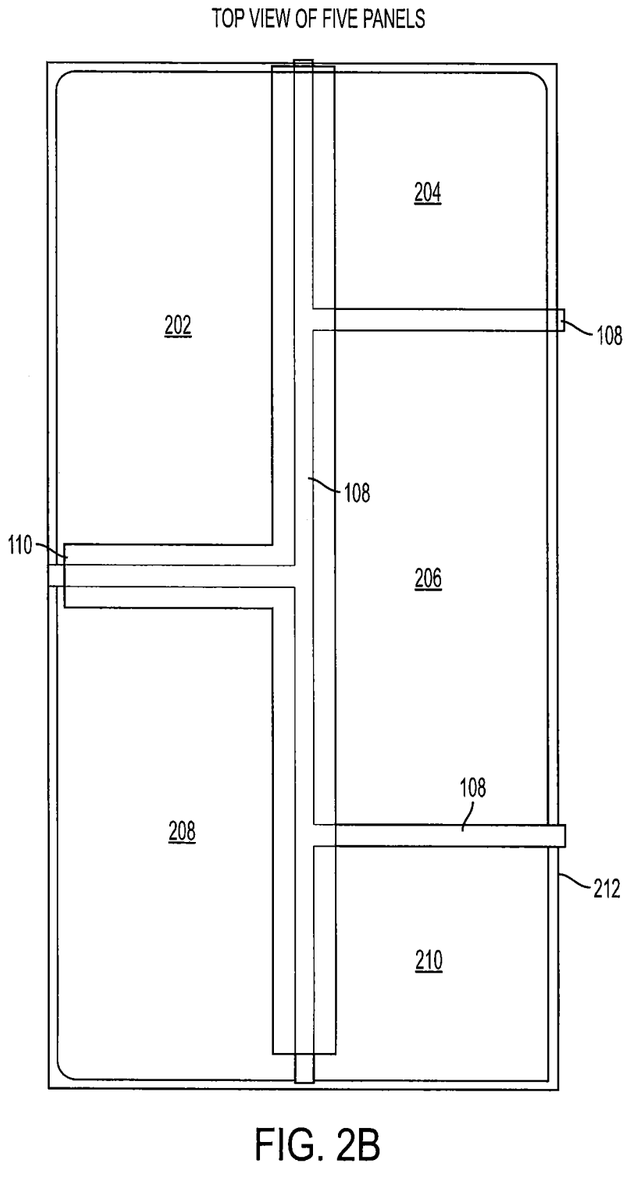
FIG. 2B is a top view illustrating five exemplary roof panels adjoined via an adhesive and attached to a roof deck according to an exemplary embodiment.
Figure 2C:
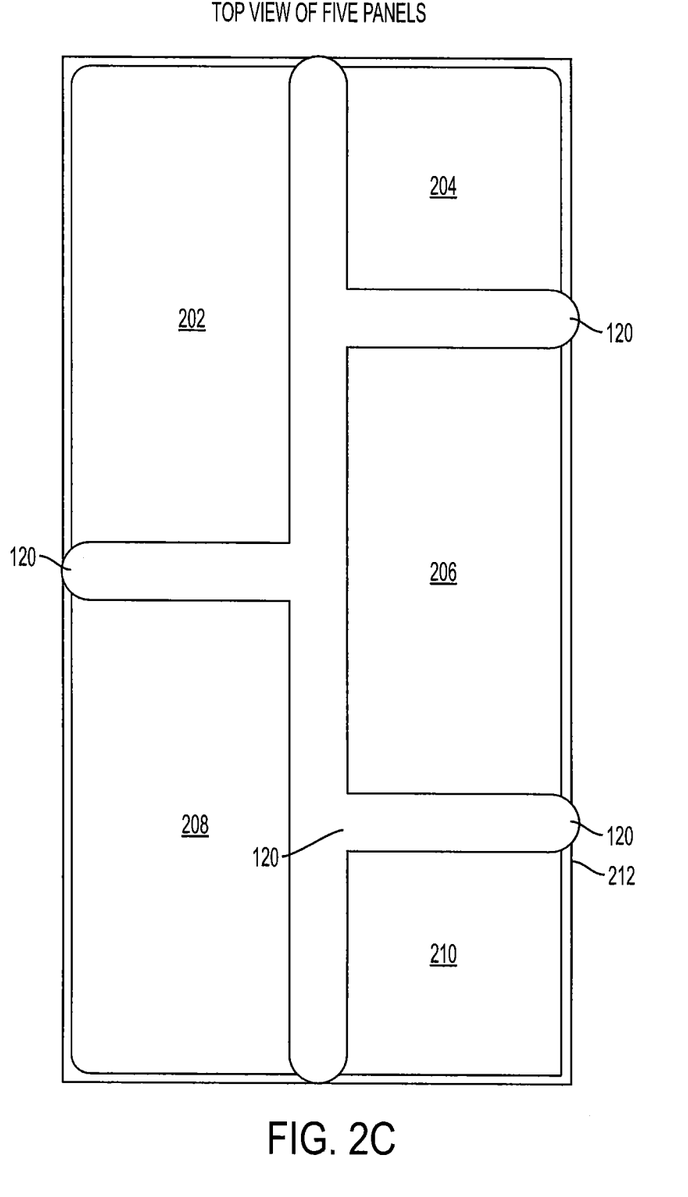
FIG. 2C is a top view illustrating five exemplary roof panels adjoined via an adhesive and a primary seam coat and attached to a roof deck according to an exemplary embodiment.

FIG. 2A is a top view illustrating five exemplary roof panels attached to a roof deck 212 according to an exemplary embodiment. FIG. 2B is a top view illustrating five exemplary roof panels adjoined via an adhesive and attached to the roof deck 212 according to an exemplary embodiment. FIG. 2C is a top view illustrating five exemplary roof panels adjoined via an adhesive and a primary seam coat and attached to the roof deck 212 according to an exemplary embodiment. Referring now to FIGS. 2A-2C, in a typical embodiment, the exemplary roof panels 202, 204, 206, 208, 210 are adjoined via, for example, an adhesive 108 and a primary seam coat 120 and attached to the roof deck 212 according to exemplary embodiments described above relative to FIGS. 1A-1C. In the embodiment illustrated in FIGS. 2A-2C, the exemplary roof panels 202, 206, and 208 are rectangular shaped while the exemplary roof panels 204 and 210 are square shaped.

Figure 3:
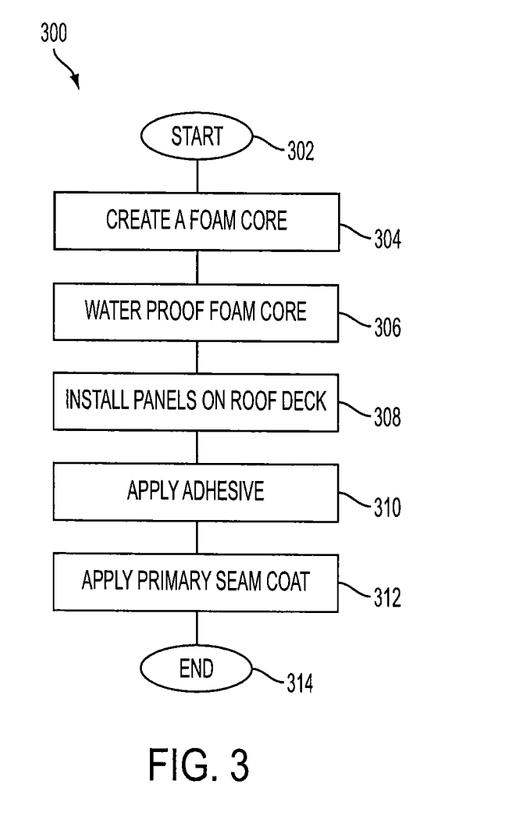
FIG. 3 is a flow diagram illustrating a process in conjunction with FIGS. 2A-2C of manufacturing exemplary roof panels and installation of the exemplary roof panels on a roof deck according to exemplary embodiments.

FIG. 3 is a flow diagram illustrating a process in conjunction with FIGS. 2A-2C of manufacturing exemplary roof panels and installation of the exemplary roof panels on a roof deck according to exemplary embodiments. In a typical embodiment, a process 300 begins at step 302. At step 304, a foam core is created. For example, the foam core is created by pouring/spraying foam into a mold or taking a foam board and preferably, but not necessarily, shaping top and bottom edges. In a typical embodiment, the foam core forms the exemplary roof panels 202, 204, 206, 208, 210. At step 306, the exemplary roof panels 202, 204, 206, 208, 210 are covered, on all sides, with a durable waterproof material, preferably (but not necessarily) a liquid that cures quickly. For exemplary purposes, a polyurea membrane is disclosed for waterproofing the exemplary roof panels 202, 204, 206, 208, 210. The polyurea membrane is durable, chemical resistant, and is available in a variety of colors; however, in alternate embodiments, any waterproof membrane may be utilized for waterproofing the exemplary roof panels 202, 204, 206, 208, 210.

In a typical embodiment, corners of polyurea membrane are shaped to avoid 90° angles; however, in alternate embodiments, corners of the polyurea membrane may be shaped to form 90° angles. At step 308, the exemplary roof panels 202, 204, 206, 208, 210 are installed on the roof deck 212 using, for example, an adhesive 112. In a typical embodiment, a bottom layer 111 of the exemplary roof panels 102, 104 has a self-adhering adhesive 112 thereon for adhering the exemplary roof panels 102, 104 to the roof deck 212. The self-adhering adhesives 112 may be, for example, water-based adhesives, solvent-based adhesives, or other commonly available self-adhering adhesives that will stick and bond the exemplary roof panels 102, 104 to the surface of the underlying roofing layer. According to alternate embodiment, the self-adhering adhesive 112 may be in the form of a plurality of spaced-apart self-adhering adhesive strips for adhering the exemplary roof panels 102, 104 to the roof deck 212.

In a typical embodiment, the adhesive 112 may be, for example, any bonding agent for installing the exemplary roof panels 202, 204, 206, 208, 210 on the roof deck 212. At step 310, the adhesive 108 is applied to waterproof seams that adjoins the exemplary roof panels 202, 204, 206, 208, 210 along with smoothening and leveling adjoining exemplary roof panels 202, 204, 206, 208, 210 with, for example, a trowel. At step 312, after applying the adhesive 108, a primary seam coat 120 is applied. In a typical embodiment, the primary seam coat 120 comprises a petroleum-based liquid that is applied to seams of the adjoining exemplary roof panels 202, 204, 206, 208, 210 to protect them from oxidation and the damage caused by winter cracking and Ultra Violet (UV) rays. In a typical embodiment, the application of the adhesive 108 and the primary seam coat 120 is performed after the exemplary roof panels 202, 204, 206, 208, 210 are attached to the roof deck. In a typical embodiment, the primary seam coat 120 may be applied via, for example, a brush roller, a spray equipment and the like. At step 314, the process 300 ends.

In a typical embodiment, each modular, insulated, generally flat roofing panel 102, 104, 202, 204, 206, 208, 210 is waterproofed on all sides before it arrives for installation on the roof deck 212. This simple departure from conventional roofing systems provides several advantages. For example, the exemplary roof panels 102, 104, 202, 204, 206, 208, 210 may be exposed to weather at any point without risk of damage. In conventional roof systems, insulation is required to be wrapped and kept out of the weather. A wet insulation panel must be thrown away. Frequently insulation is damaged before reaching a job site. The exemplary roof panels 102, 104, 202, 204, 206, 208, 210 arrive at a job site complete. A majority of the exemplary sustainable roof system using the exemplary roof panels 102, 104, 202, 204, 206, 208, 210 is installed in the same amount of time as required for traditional roof insulation. Once the exemplary roof panels 102, 104, 202, 204, 206, 208, 210 are installed on the roof deck 212 and the seams are sealed, the roof is waterproof. Furthermore, a threat of rain does not inhibit installation of the exemplary roof panels 102, 104, 202, 204, 206, 208, 210. Conventional roof systems require dry weather and time to install multiple layers. The reduced installation time is extremely valuable on a new commercial projects since interior work cannot begin until a building envelope is complete. Typically, according to conventional roof systems, entire projects are put on hold until the weather pattern allows for the installation of traditional roof systems.

The exemplary roof panels 102, 104, 202, 204, 206, 208, 210 are completely waterproofed on all sides. Water that happens to enter the exemplary roof panels 102, 104, 202, 204, 206, 208, 210 is not allowed to leave the exemplary roof panels 102, 104, 202, 204, 206, 208, 210 thereby substantially reducing interior damage and preventing adjoining exemplary roof panels 102, 104, 202, 204, 206, 208, 210 from being damaged. Individual damaged roof panels may be replaced on an individual basis. This results in reducing insurance in areas of interior damage liability and exterior repair or replacement of the roof. According to conventional roof systems, a small leak or minor storm damage can easily lead to complete roof replacement while causing major interior damage as water runs through and under the conventional roof system.

Job site accidents from burns and fire are nonexistent with the exemplary sustainable roof system resulting in substantial reduction in strain related workers compensation claims. The weight of the exemplary sustainable roof system is dispersed in each exemplary roof panel 102, 104, 202, 204, 206, 208, 210 which can be easily carried by an individual. Conventional roofing products come in heavy rolls (some weighing hundreds of pounds) and/or large (up to 100 lb.) kegs of asphalt. Some current systems use hot tar kettles (heating material to 450 degrees) or torches.

The exemplary roof panels 102, 104, 202, 204, 206, 208, 210 are expected to last approximately 40 years. Polyurea and other possible top coat materials age from top down instead of breaking down like asphalt. When the base coat on the exemplary roof panels 102, 104, 202, 204, 206, 208, 210 begins to show through the top wear coat (contrasting color) it can be cleaned and re-coated. Re-coating costs less than replacement and provide minimal interruption to business. In conventional roof systems, the roof is required to be completely replaced several times in the initial 40 year period. The exemplary sustainable roof system utilizing the exemplary roof panels 102, 104, 202, 204, 206, 208, 210 conservatively estimates saving users the cost of at least two complete roof replacements if a twenty year system was installed.

The exemplary sustainable roof system utilizing the exemplary roof panels 102, 104, 202, 204, 206, 208, 210 do not contribute to chemical pollution (before or after installation). Polyurea and other possible materials have no V.O.C.s. Rain water runoff will be completely safe and free of debris (many roofing products loose granules and chemicals throughout life of roof). Building owners could harvest rainwater, store in underground cisterns and use the free water to water landscaping and other gray water applications. One possible use of water may be, for example, to recycle it over and over to cool solar panels for maximum efficiency.

Solar cells could be inserted on top of the exemplary sustainable roof system during production. Installation on the roof would require minimal additional labor. The exemplary roof panels 102, 104, 202, 204, 206, 208, 210 can be linked on the roof deck and connected to a power source by an electrician. Solar panels work best when they are cool. In white, the exemplary sustainable roof system offers a cooler substrate. In addition, constant water does not reduce life expectancy of the exemplary sustainable roof system. Recycled water may be used to cool the solar panels over and over. At the end of the 30 to 40 years, new solar panels may be inserted into the existing frames or mounted directly on top of the frames. This process could be done independently of cleaning and re-coating the roof.

The exemplary roof panels 102, 104, 202, 204, 206, 208, 210 are expected to last approximately 40 years. Polyurea and other possible top coat materials age from top down instead of breaking down like asphalt. When the base coat on the exemplary roof panels 102, 104, 202, 204, 206, 208, 210 begins to show through the top wear coat (contrasting color) it can be cleaned and re-coated. Re-coating costs less than replacement and provide minimal interruption to business. In conventional roof systems, the roof would have to be completely replaced several times in the initial 40 year period.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A roofing panel comprising:
    a front surface, a top surface, a bottom surface, a right-side surface, a left-side surface and a rear surface, wherein the front surface, the top surface, the bottom surface, the right-side surface, the left-side surface and the rear surface comprise a waterproofing membrane;
    a plurality of top perimeter edges, wherein the plurality of top perimeter edges comprise substantially concave bevels;
    a plurality of bottom perimeter edges, wherein the plurality of bottom perimeter edges comprise substantially convex bevels; and
    wherein the bottom surface comprises an adhesive for adhering the roofing panel to a roof deck.

2. The roofing panel of claim 1, wherein the front surface, the right-side surface, the left-side surface and the rear surface comprise an adhesive for adhering the roofing panel to additional roofing panels.

3. The roofing panel of claim 1, wherein the roofing panel is rectangular shaped.

4. The roofing panel of claim 1, wherein the roofing panel is square shaped.

5. The roofing panel of claim 1, wherein roofing panel comprises insulated foam.

6. The roofing panel of claim 1, wherein the waterproofing membrane comprises at least one of a silicone based waterproofing membrane, a polyurethane membrane, a polyurea membrane, a bituminous membrane, and a single ply membrane.

7. The roofing panel of claim 1, wherein the roofing panel provides outer containment of water for drainage.

8. The roofing panel of claim 2, wherein the adhesives comprise at least one of water-based adhesives and solvent-based adhesives.

9. The roofing panel of claim 1, wherein the roofing panels are substantially flat.

10. A roofing system for a generally flat roof, the system comprising:
    a generally flat roof deck;
    a plurality of roofing panels, wherein each roofing panel of the plurality of roofing panels comprise:
        a front surface, a top surface, a bottom surface, a right-side surface, a left-side surface and a rear surface, wherein the front surface, the top surface, the bottom surface, the right-side surface, the left-side surface and the rear surface comprise a waterproofing membrane;
        a plurality of top perimeter edges, wherein the plurality of top perimeter edges comprise substantially concave bevels;
        a plurality of bottom perimeter edges, wherein the plurality of bottom perimeter edges comprise substantially convex bevels; and
        wherein the bottom surface comprises an adhesive for adhering each said roofing panel to the generally flat roof deck.

11. The roofing system of claim 10, wherein the front surface, the right-side surface, the left-side surface and the rear surface comprise an adhesive that adheres the plurality of roofing panels to one another.

12. The roofing system of claim 10, wherein the plurality of roofing panels are rectangular shaped.

13. The roofing system of claim 10, wherein the plurality of roofing panels are square shaped.

14. The roofing system of claim 10, wherein the plurality of roofing panels comprise insulated foam.

15. The roofing system of claim 10, wherein the waterproofing membrane comprises at least one of a silicone based waterproofing membrane, a polyurethane membrane, a polyurea membrane, a bituminous membrane, and a single ply membrane.

16. The roofing system of claim 10, wherein the plurality of roofing panels provide outer containment of water for drainage.

17. The roofing system of claim 10, wherein the plurality of roofing panels are substantially flat.

18. The roofing system of claim 10, wherein a plurality of seams created by adjoining the plurality of roofing panels are sealed via at least one of application of adhesive on the plurality of seams, application of waterproof reinforcement strips on the plurality of seams, and application of a primary seam coat on the plurality of seams.

19. The roofing system of claim 18, wherein the adhesives comprise at least one of water-based adhesives and solvent-based adhesives.

* * * * *